Figure 6:
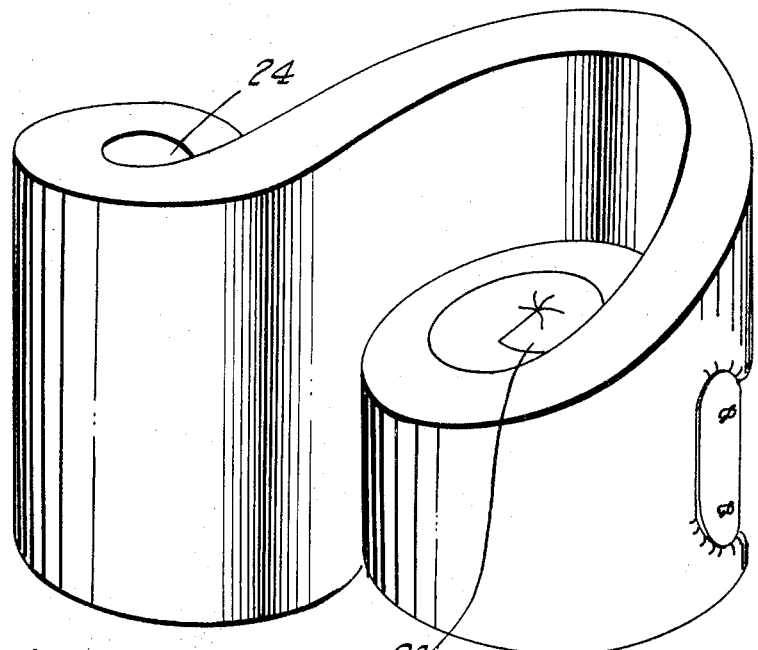

United States Patent
Hermelin

[15] 3,678,553
[45] July 25, 1972

[54] PLASTIC FOAM FURNITURE

[72] Inventor: Marc S. Hermelin, c/o Sidney B. Ring P. O. Box 6825, Brentwood, Mo. 63144

[22] Filed: March 13, 1969

[21] Appl. No.: 80,701

[52] U.S. Cl. ................................. 29/91.1, 297/456
[51] Int. Cl. ........................... B68g 7/00, B68g 11/04
[58] Field of Search ............... 29/91, 91.1, 91.5, 419; 297/456, DIG. 1; 5/345

[56] References Cited

UNITED STATES PATENTS

| | | | |
|---|---|---|---|
| 3,302,276 | 2/1967 | Williams et al. | 29/91.1 UX |
| 3,423,127 | 1/1969 | Shankman | 29/91.1 UX |
| 3,438,676 | 4/1969 | Brosk | 297/456 X |
| 3,476,497 | 11/1969 | Cashen et al. | 297/456 UX |
| 3,495,874 | 2/1970 | Dean | 297/456 |

Primary Examiner—Frank T. Yost
Attorney—Sidney B. Ring

[57] ABSTRACT

A method of preparing an article of furniture which comprises (1) shaping a layer of plastic foam to the desired contour on an essentially two dimensional plane; (2) bending and/or rolling said contoured layer of foam so as to yield an article of furniture of the desired shape on an essentially three dimensional plane and (3) maintaining said three dimensional shape by suitable positioning means; and to the articles of furniture formed by this method.

5 Claims, 9 Drawing Figures

PATENTED JUL 25 1972
3,678,553
SHEET 1 OF 3
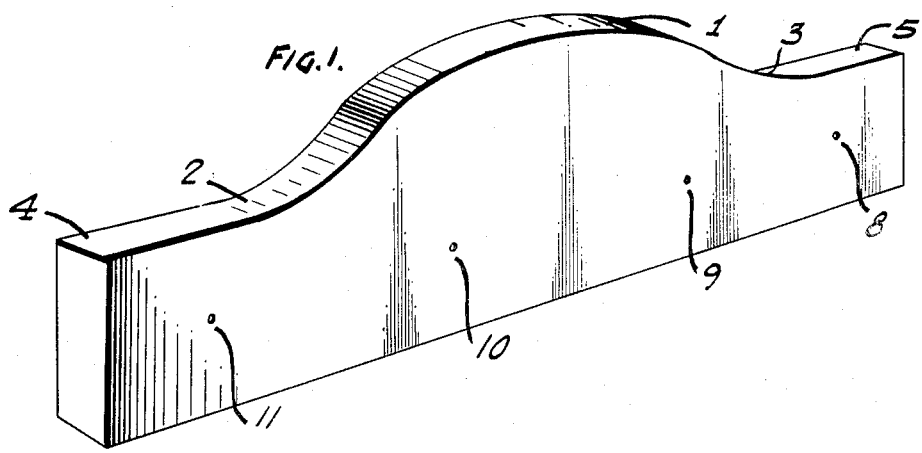
FIG.1.
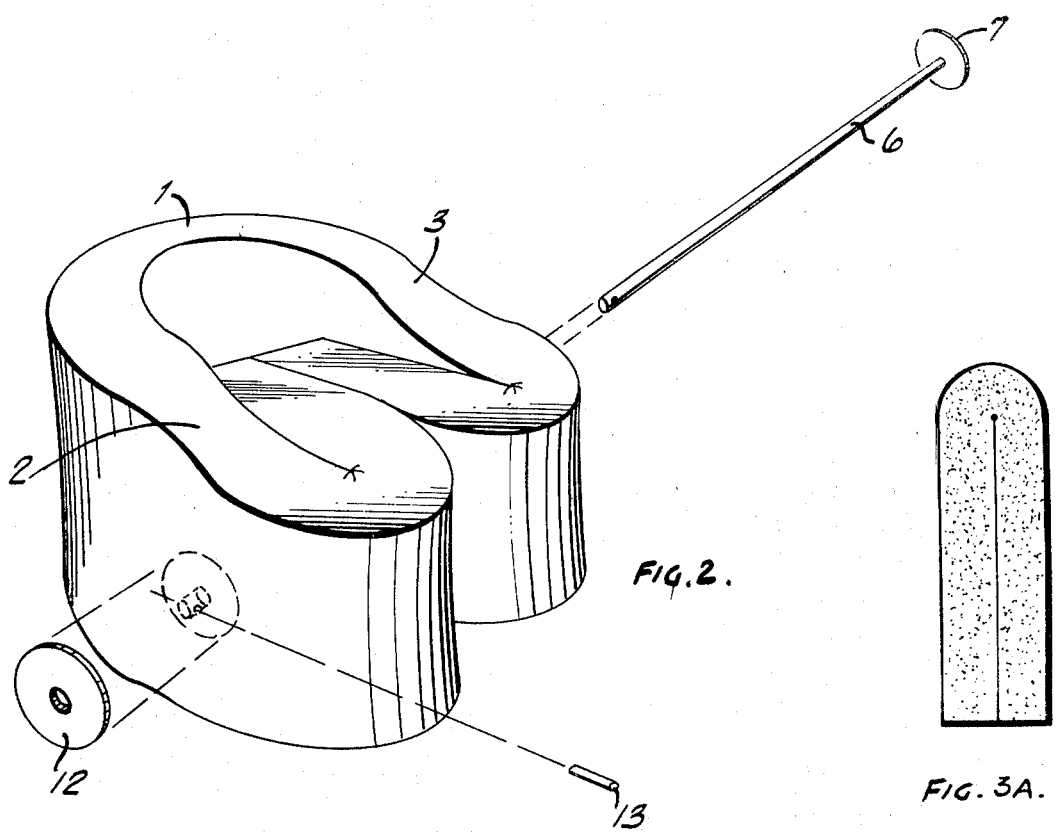
FIG.2.
FIG.3A.
MARC S. HERMELIN
INVENTOR
BY Sidney Bo Ring
ATTORNEY

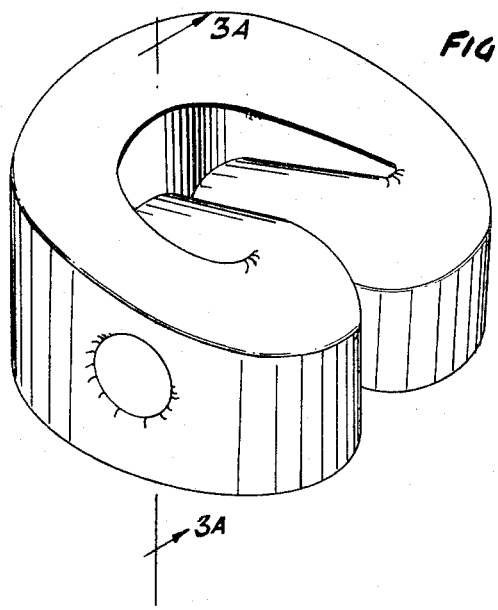
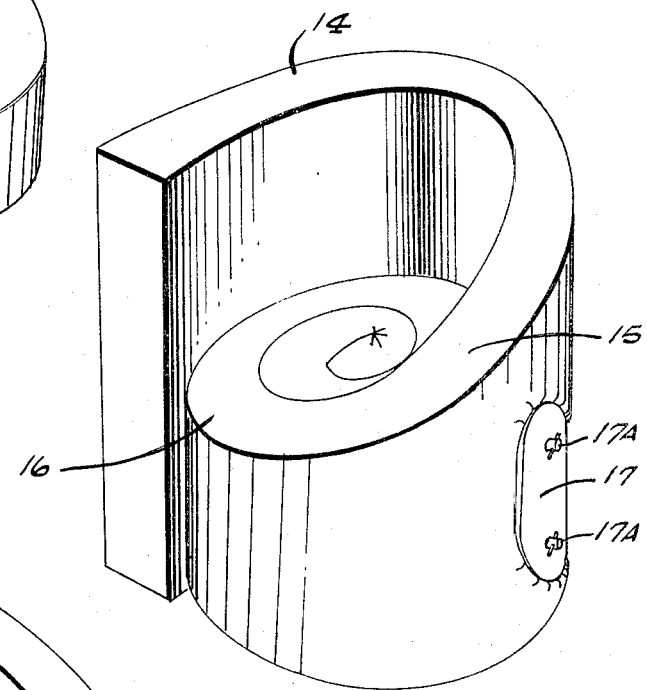
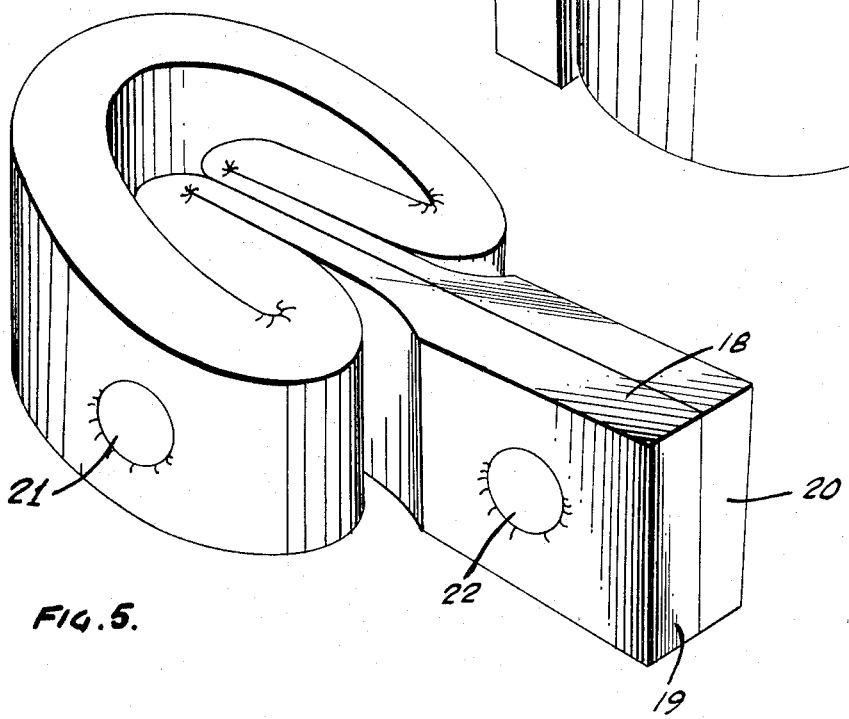
FIG.3.
FIG.4.
FIG.5.
MARC S. HERMELIN
INVENTOR

MARC S. HERMELIN
INVENTOR

BY Sidney B. Ring
ATTORNEY

PLASTIC FOAM FURNITURE

In the furniture industry it is highly desirable to produce novel shapes from the newer materials at the lowest possible price. It is also important that such furniture have a fresh modern look so as to enhance their sales appeal.

I have now discovered that novel furniture having a fresh modern look can be inexpensively prepared from readily available materials such as plastic foam.

The invention is practiced in the following manner:

A layer of plastic foam, preferably a flexible urethane foam, having sufficient thickness so as to yield a stable article of furniture when completed, is shaped to a desired contour on an essentially two dimensional plane (i.e. except for the thickness of the foam layer). The contoured layer of foam is then rolled and/or bent to shape the desired article of furniture on a three dimensional plane. The shaped foam is maintained in this three dimensional shape by any suitable means, such as by a positioning bar and/or adhesives, etc.

The layer of foam may be of any suitable thickness and/or the thickness may vary at various areas of a single piece of foam, provided the final article of furniture produced from such thickness can be rolled and/or bent to produce satisfactory stability in the final article of furniture. In practice thicknesses of about 2 to 24 or more inches, such as about 3 to 18 inches, for example about 5 to 15 inches, but preferably about 6 to 10 inches can be employed. A plurality of layers can also be used.

By the term "contour on an essentially two dimensional plane" is meant the contour of the layer of foam, ignoring thickness, formed before rolling and/or bending. By the term "shape in an essentially three dimensional plane" is meant the shape of the final piece of furniture after bending and/or rolling the original two dimensionally contoured layer of foam.

The layer of plastic foam employed may be of any suitable foam material capable of being put through the operations of this invention so as to yield the final article of furniture having the comfort desired. Because of its flexibility, compressibility, plastic memory, etc. it is desirable to employ a flexible plastic foam, and more preferably a polyurethane foam.

The plastic foam may be covered by any suitable material such as fabric, paints, lacquers, etc. In the preferred embodiment the plastic form is decoratively sprayed with the desired color of paints or lacquers having the desired texture which may range from smooth and leather-like to soft and fabric-like.

Referring to the drawings which are presented in perspective:

FIG. 1 represents a layer of plastic foam which has been contoured to the shape on a two dimensional plane (i.e. apart from its thickness) desired in the final article of furniture, 1 representing the back of the chair, 2 and 3 the arms and 4 and 5 the seat. The ends of the contoured layer of foam of FIG. 1 are folded back on themselves so that a chair shown in FIG. 2 is formed which is permanently positioned in the desired shape by inserting positioning bar 6 having end plate 7 through holes 8, 9, 10 and 11 which have been properly aligned. The positioning bar is maintained in this position by placing the second end plate 12 in position and inserting pin 13 to yield an article of furniture, an easy chair, shown in FIG. 2 having a sculptured look.

FIG. 3 represents an easy chair formed in the manner of FIG. 1 and 2 except that the edges of foam are more round. In FIG. 3 the contoured layer of plastic foam is prepared, folded in the manner of FIGS. 1 and 2 whereupon the positioning bar inserted and positioned.

A convenient method of preparing full round edges is to bend or fold a sheet of plastic foam back upon itself so that a double layer of foam is obtained as shown in FIG. 3A which is a section along line 3A—3A of FIG. 3. The non-rounded edges of the double layer are then contoured to the desired shape on a two dimensional plane (i.e. ignoring thickness). This double layer with full round edges is then shaped on a three dimensional plane to yield the desired article of furniture with esthetically pleasing full round edges. For example, the article of furniture shown in FIG. 3 can be prepared from a rectangular layer of plastic foam whose long sides have been properly contoured. As shown in FIG. 3A, this layer of foam is then folded back upon itself lengthwise substantially along the midpoint of the foam sheet so as to yield a fully rounded double layer contoured sheet of foam, which is then shaped on a three dimensional plane to yield the chair maintained in proper shape by a positioning bar.

Thus, rounded esthetic shapes having a sculptured look may be prepared by first folding on one axis to prepare the full round edges and then folding and/or shaping on a second axis substantially at right angles to the first axis. This combination, besides being esthetic in appearance, has the proper degree of compaction and compression to yield stable, comfortable articles of furniture having a sculptured appearance.

FIG. 4 represents a snail-like article of furniture where the layer of foam is contoured on a two dimensional plane to yield the desired shape when rolled so that 14 is the back and 15 arm which descends at 16 and is then rolled back upon itself to yield the seat of a chair which resembles a snail. The positioning bar and plate 17, having 2 positioning pins 17A, is inserted into two series of holes which have been properly aligned.

FIG. 5 represents the easy chair of FIG. 2 with a built-in ottoman 18. This is formed by essentially employing the chair contoured in FIG. 1 having extending ottoman segments 19 and 20 and inserting a position bar and plate at 21 and 22. This chair with integrated ottoman may be formed of a single piece of contoured plastic foam as shown in FIG. 5 or may be formed of two pieces, one piece forming the chair section and a second piece folded back on itself to form the ottoman section. Alternatively the ottoman may be formed in two section 19 and 20.

FIG. 6 represents a double snail where the snail chair of FIG. 4 is rolled back on itself in the opposite direction so as to yield two interlocking chairs having seating positions at 23 and 24, thus forming dual chairs in the nature of a love seat.

Figure 7:
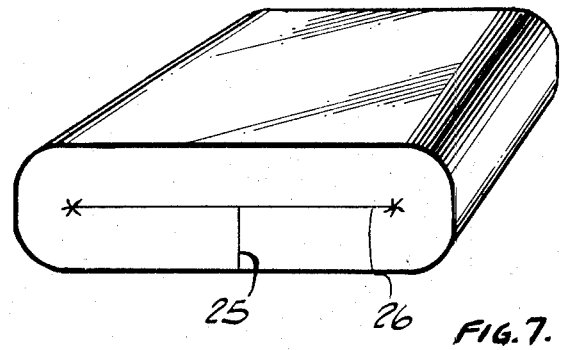
Figure 8:
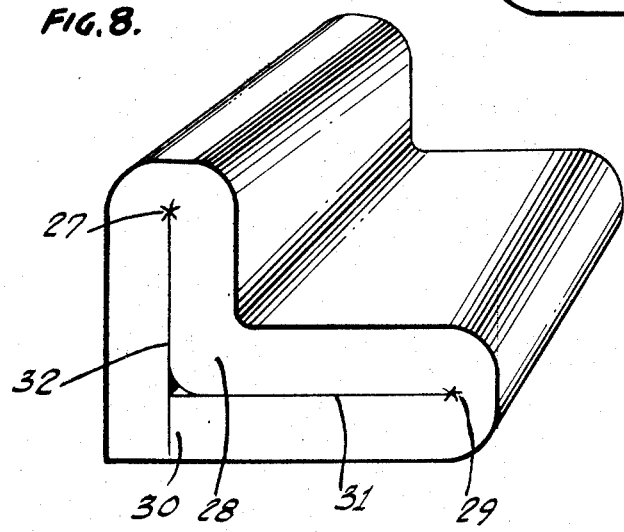

FIGS. 7 and 8 represent other embodiments of this invention wherein adhesives are employed in place of positioning bars. In these FIGURES a layer of foam which are in essentially rectangular in shape is folded back on itself. In FIG. 7 the ends are joined at 25, one layer being bonded to the second layer. The lines of jointure and adhesion are shown at 25 and 26. This article of furniture is a low backless and armless settee or ottoman.

FIG. 8 represents a chair or sofa which is formed from a rectangular layer of foam which has been folded at 27, then at 28 and then folded back on itself at 29, so as to meet the opposite end of the rectangular foam layer at 30. The jointures of layers are maintained in position by adhesives at lines 31 and 32 to form the desired seat. Of course it is understood that the articles of furniture shown in FIGS. 7 and 8 may be maintained in position by positioning bars as shown in FIGS. 1 – 6 as well as adhesives. If desired, an auxiliary sheet material such as a board, plywood, etc. may be inserted along lines 32 in FIG. 8 to furnish an auxiliary support along the entire back of the chair and the layers of foam are adhered to it instead of to each other.

It is to be noted that folding or bending the layer of foam back on itself in FIGS. 7 and 8 produce well rounded edges.

It is to be noted that the plastic foam itself essentially forms the complete article of furniture thus avoiding other embellishments such as superstructures, frames, etc. although these may be employed if desired. The essence of the present invention is that the foam itself is "sculptured" into furniture. Just as an sculptor employs clay to form a three-dimensional piece of sculpture so the furniture maker in the present invention employs his "clay" of plastic foam in the present invention to sculpture the shape of his furniture into novel and interesting shapes which may be abstract, whimsical, imitative of nature, etc. The final product has an attractive sculptured appearance.

Stated another way, the furniture of this invention is more than functional. It is an expression of art and/or nature blending functional with artistic expression while employing modern plastics having the desired tensile and compressive forces and elastic memory. It is a fresh modern expression of the furniture art creating an entity of function and art.

The outer layer of skin or coating on the foam may be obtained by a wide variety of methods. For example, the coating or skin may be imparted during the foaming process so that it is an integral part of the foam. In addition, a skin may be imparted to the open pores of the foam during bonding by proper heating and sealing. In these instances the coating is derived from the foam itself.

The coating may also be obtained by applying a material other than that obtained directly from the foams. Thus, coatings may be applied by dipping, spraying, brushing, etc., paint, plastic, lacquer, etc., to the foamed material. In addition, the other layer may be applied in the manner of conventional upholstery by covering the piece with fabric, leather, plastic, stretch fabric or stretch plastic, etc. It may have any desired color.

The furniture of this invention may be used as such without further support by allowing it to rest directly on floor or it may be placed on a support or superstructure of some kind, including for example a pedestal, legs, a solid base, etc., provided the support or superstructure does not directly confine or support the body of the occupant but rather acts as a support for the entire unit system. Stated another way the foam is its own superstructure.

A discussion of various types of foamed plastics which may in whole or in part be employed herein is found in the MODERN PLASTICS ENCYCLOPEDIA 1967 Edition published by McGraw Hill, New York, New York, pp 348 – 369, which is by reference incorporated into this application as if part hereof. This article on pp 349 – 354 also discusses various types of polyurethane foams, which is the preferred material because of its excellent flexibility, resiliency and load bearing ability. However, other foamed plastics may also be employed such as those described in the above MODERN PLASTICS ENCYCLOPEDIA.

As is quite evident, other classes and types of resilient materials and configurations besides those specifically mentioned herein can be employed in this invention. It is, therefore, not only impossible to attempt a comprehensive catalogue of such resilient materials and configurations, but to attempt to describe the invention in its broadest aspects in terms of all specific materials and configurations would be too voluminous and unnecessary since one skilled in the art could by following the description and spirit of this invention herein select useful materials and configurations. This invention lies in the use of suitable resilient materials and their individual composition is important only in the sense that their properties can affect its function as suitable materials which can be arranged in a configuration to produce the furniture of this invention. To precisely define each specific useful material and configuration in light of the present disclosure would merely call for knowledge within the skill of the art.

Having thus described my invention what I claim as new and desire to obtain by Letters Patent is

1. A method of preparing an article of furniture which comprises (1) shaping a layer of plastic foam to the desired contour on an essentially two dimensional plane; (2) shaping said contoured layer so as to yield an article of furniture of the desired shape on an essentially three dimensional plane, and (3) maintaining said three dimensional shape by a suitable positioning means, said article of furniture being a unit system capable of supporting the occupant without a superstructure.

2. The method of claim 1 where the positioning means of (3) is a positioning bar inserted through the body of the article of furniture.

3. The method of claim 2 where the positioning means is an adhesive.

4. The method of claim 1 where the shaping in (2) is rolling.

5. The method of claim 1 where the shaping in (2) is bending.

* * * * *